Patented Dec. 15, 1942

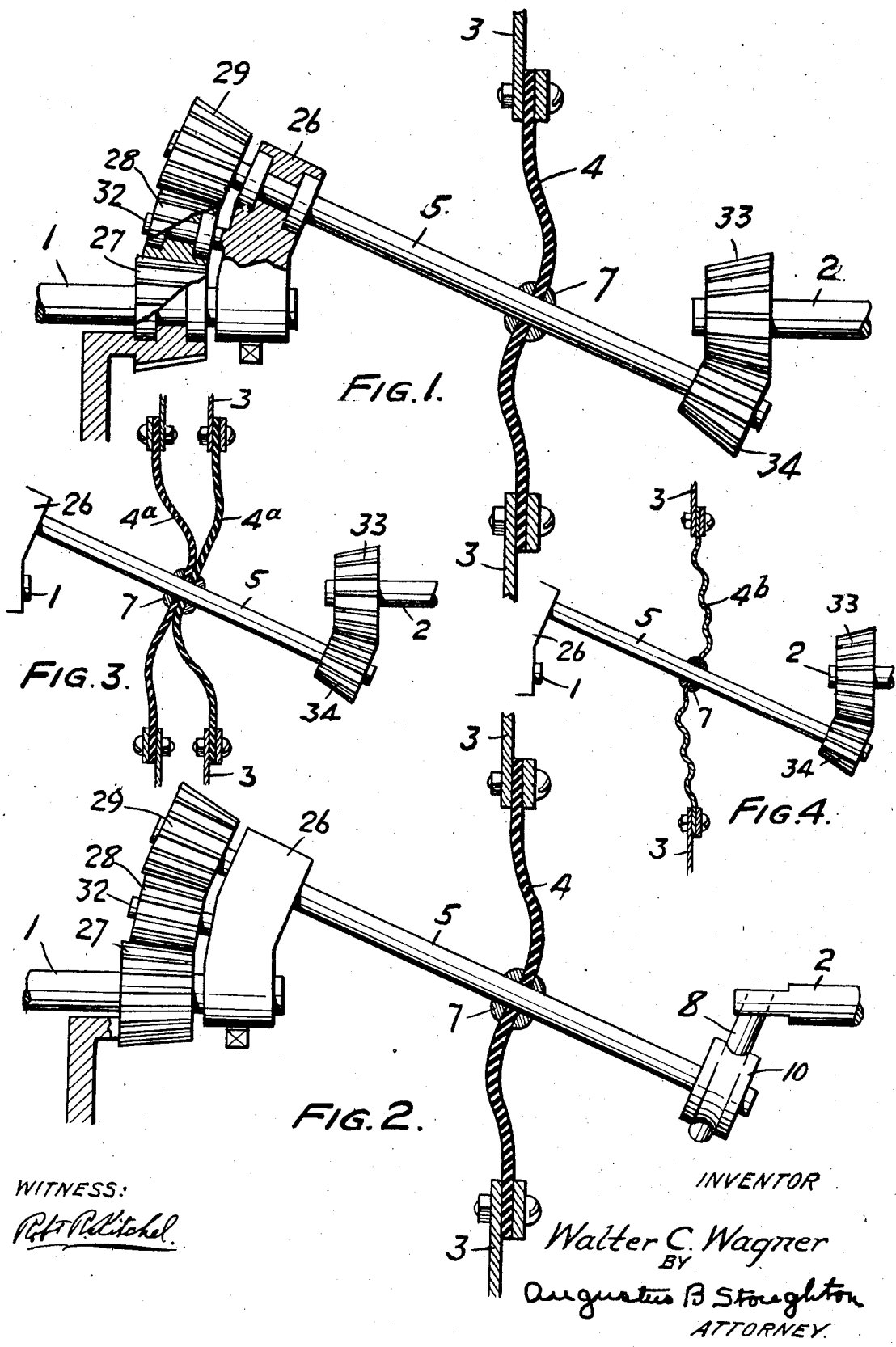

2,305,505

UNITED STATES PATENT OFFICE 2,305,505

MOTION TRANSMISSION GEAR

Walter C. Wagner, Ardmore, Pa.

Application December 21, 1940, Serial No. 371,151

4 Claims. (Cl. 286—29)

Objects of the present invention are: to provide comparatively simple, and reliable gear for transmitting the rotary motion of a shaft located on one side of a sealed partition to a shaft on the other side of the partition without breaking the seal of the partition and with minimum of friction; and to subject the flexible diaphragm employed for the accomplishment of this result to very little flexure or bending.

Other objects of the invention will appear from the following description at the end of which the invention will be claimed.

The invention comprises the improvements to be presently described and finally claimed.

In the following description reference will be made to the accompanying drawing forming part hereof and in which:

Fig. 1 diagrammatically and partly in section illustrates motion transmission gear embodying features of the invention;

Fig. 2 illustrates the same including a modification; and

Figs. 3 and 4 are views illustrating modifications of the diaphragm shown in Fig. 1.

1 and 2 are, respectively, a driving and a driven shaft and they are usually arranged in alignment. These shafts are arranged on opposite sides of a gas-tight partition 3. 4 is a flexible diaphragm and it is secured to the partition and it covers an opening therein. 5 is a shaft or rod arranged through the diaphragm so that one end is on one side of the diaphragm and the other end is on the other side of the diaphragm. The shaft or rod is secured and sealed to the diaphragm as at 7 and it is disposed at an inclination to the center line of the shaft and crosses the same.

Since the shaft or rod 5 does not rotate about its own axis, any possible twisting stresses on the diaphragm are completely eliminated. An epicyclic gear train is attached to the end of shaft 1 consisting of a train arm 26 attached to shaft 1 and rotating therewith, and the gear train comprising bevel gears 27, 28 and 29. The gear 27 is mounted on shaft 1 in rotatable relation thereto by means of thrust ball bearings but is held from rotating by an integral arm externally attached to a non-rotating part. The intermediate gear 28 is journaled by thrust ball bearings on a shaft 32 integral with the arm 26. The gear 29 is identical with gear 27 and is fixedly attached to the end of the rod or shaft 5 which is rotatably journaled in the train arm 26 by thrust ball bearings. The function of the thrust ball bearings is to provide fixed axial relations of the gears on their shafts and insure their proper engagement. The driven shaft 2 carries affixed at its end a bevel gear 33 which engages a co-operating bevel gear 34 attached to the end of shaft 5.

Rotation of shaft 1 rotates the train arm 26, the fixed gear 27 causing the gear 29 and the shaft 5 to revolve about the axis of shaft 1 without turning. This movement of the shaft 5 rolls the gear 34, which also revolves without turning, around the gear 33 causing it to rotate and turn shaft 2. The gears 33 and 34 have a 2 to 1 gear ratio for the purpose of turning the shaft 2 at the same speed as the shaft 1. If it is desired to change the relative speeds of shafts 1 and 2, this is readily accomplished by suitable changes in gear ratio in either the epicyclic gear train or the gears 33 and 34. Thus this device, in addition to eliminating twisting stresses on the diaphragm 4, constitutes a speed changing mechanism. Also, the shaft 2 need not be exactly aligned with shaft 1 and the gears 33 and 34 can be suitably designed to permit satisfactory operation with quite wide misalignments. In this figure the member 5 which does not rotate on its own axis is guided by the arm attached to the shaft 1.

The construction and operation of the device shown in Fig. 2 are as above described except as follows: the bevel gears 33 and 34 are replaced by an arm 8 projecting generally radially from the shaft 2 and pressed upon by roller 10 revolvably mounted on the shaft or rod 5.

In Fig. 3, the construction and operation are as has been described in connection with Fig. 1 except that two diaphragms 4ᵃ are employed in order that a fluid or liquid may be placed between them in order to insure against leakage past or through them.

The construction and mode of operation illustrated in Fig. 4 are as above described except that the diaphragm 4ᵇ is of corrugated metal. In general, the diaphragm may be composed of any desired material such as rubber, skins or membranes or synthetic compounds.

It will be obvious to those skilled in the art to which the invention relates that modifications may be made in details of construction and arrangement without departing from the spirit of the invention which is not limited as to such matters or as to matters of mere form.

I claim:

1. In mechanism for transmitting rotary motion from a driving to a driven shaft arranged on opposite sides of a partition, the combination of, a flexible diaphragm secured to said partition and covering an opening therein, a rod non-rotatable in respect to its own axis and disposed at an inclination to and intercepting the axis of rotation of the driving shaft, said diaphragm being sealed to said rod substantially at the point of intersection of said rod and said axis, a pair of intermeshing beveled gears of which one is fast on one end of the rod and of which the other is fast to one of the shafts, and an epicyclic beveled gear train associated with the other of said shafts and comprising, an arm radially fixed to the last-mentioned shaft and in which the other end part of the rod is journaled, and a train of three intermeshing beveled gears of which one is fast on the rod and another is revolvably mounted on the train arm and the third is fixedly mounted concentric with the last-mentioned shaft.

2. In mechanism for transmitting rotary motion from a driving to a driven shaft arranged on opposite sides of a partition, the combination of, a flexible diaphragm secured to said partition and covering an opening therein, a rod non-rotatable in respect to its own axis and disposed at an inclination to and intercepting the axis of rotation of the driving shaft, said diaphragm being sealed to said rod substantially at the point of intersection of said rod and said axis, means interposed between one end of the rod and one of said shafts and adapted to transmit motion between them, and an epicyclic beveled gear train associated with the other of said shafts and comprising, an arm radially fixed to the last-mentioned shaft and in which the other end part of the rod is journaled, and a train of three intermeshing beveled gears of which one is fast on the rod and another is revolvably mounted on the train arm and the third is fixedly mounted concentric with the last-mentioned shaft.

3. The combination substantially as described in claim 2 and in which two diaphragms and their complemental partitions arranged in spaced relation are employed for the purpose of retaining a liquid or fluid between them.

4. In mechanism for transmitting rotary motion from a driving to a driven shaft arranged on opposite sides of a partition, the combination of, a flexible diaphragm secured to said partition and covering an opening therein, a rod disposed at an inclination to and intercepting the axis of rotation of the driving shaft, said diaphragm being sealed to said rod substantially at the point of intersection of said rod and said axis, first means for rotating said rod about the axis of rotation of said driving shaft, said first means being constructed and arranged independently of said diaphragm to prevent rotation of said rod about its own axis, and second means for translating the rotation of said rod to rotation of the driven shaft.

WALTER C. WAGNER.